Sept. 10, 1929.  P. G. BULKLEY  1,727,744
FLOW REGULATOR
Original Filed Dec. 14, 1925
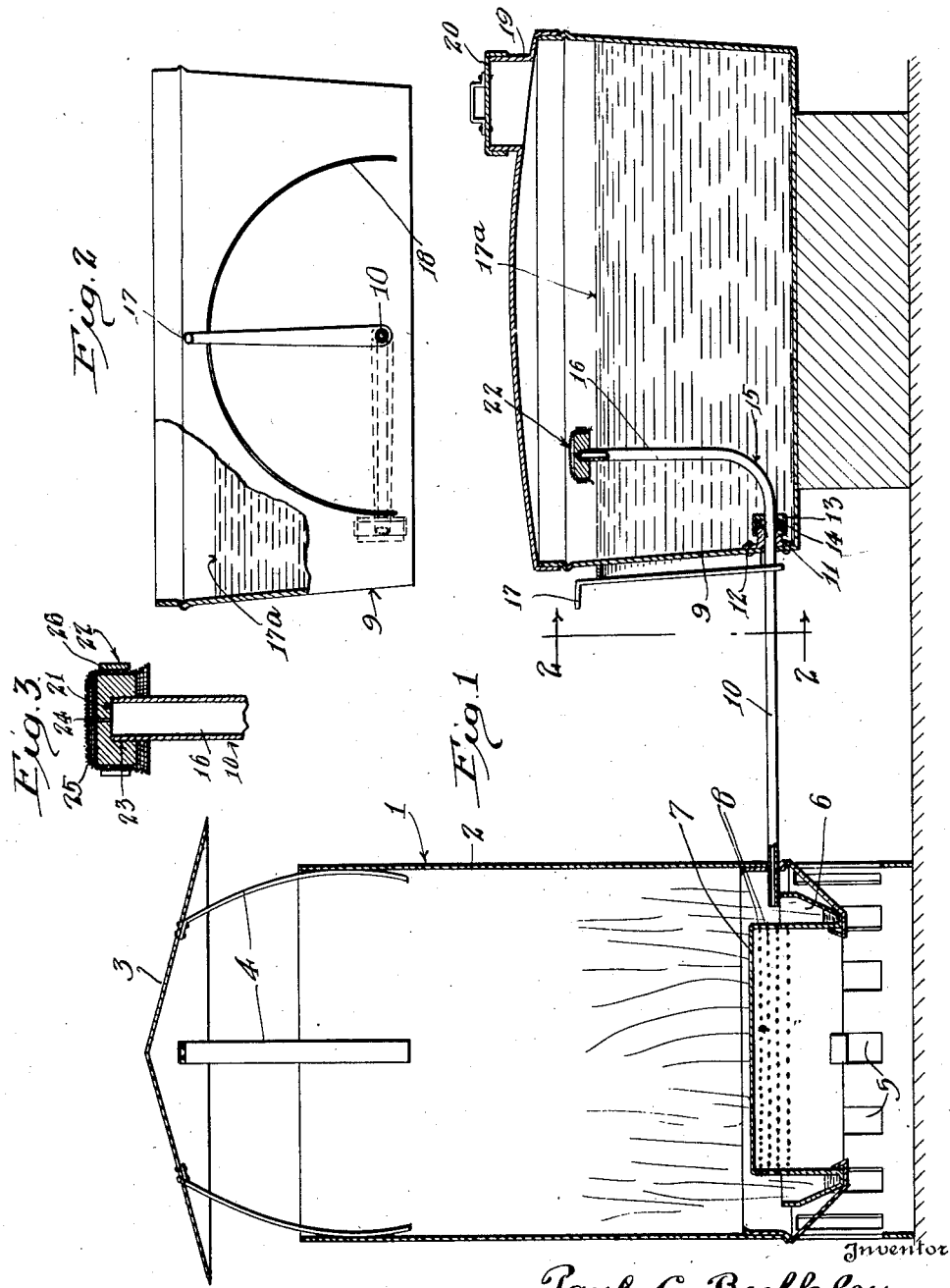
Inventor
Paul G. Bulkley
By Lyon & Lyon
Attorneys Patented Sept. 10, 1929.

1,727,744

UNITED STATES PATENT OFFICE.

PAUL G. BULKLEY, OF AZUSA, CALIFORNIA, ASSIGNOR TO KITTLE MANUFACTURING COMPANY, A CORPORATION OF CALIFORNIA.

FLOW REGULATOR.

Application filed December 14, 1925, Serial No. 75,355. Renewed July 9, 1929.

This invention relates to flow regulators and more particularly to a flow regulator adapted for use in connection with orchard heaters for regulating the rate of flow of fuel that is burned in the orchard heater from the fuel container to the fuel burner.

Orchard heaters are extensively used for the purpose of heating the air in an orchard, such as an orange orchard, in cold weather to prevent the freezing of the orange trees and the crop of oranges that may be on the trees. The use of such orchard heaters enables the orchardist to prevent the frost from killing the trees in which the sap is flowing at the time the freeze or frost occurs so that the trees are saved from the frost and likewise the fruit upon the trees is prevented from becoming frost-bitten or frozen in which condition it has practically no market value. The control of these orchard heaters as to the rate of burning and the heat supplied thereby has been extremely difficult and has in most cases required a large crew of men to be on hand in an orchard when the fruit is threatened so that the orchard heaters may be controlled as to the amount of fuel being burned and to insure that the orchard heater is operating to prevent the freezing of the trees. It is customary in southern California to employ a crew of cheap laborers on nights when the fruit is threatened which must be on hand at all times to watch and control the burning of these orchard heaters.

The hiring and maintaining of such a crew of laborers is an expense and it is the principal object of this invention to eliminate or reduce, by providing an orchard heater in which a flow regulator is provided which will automatically control the supply of fuel to the burner of the orchard heater, so as to eliminate the necessity of the manual control of the orchard heater during the use thereof.

Another object of this invention is to provide a flow regulator for use in connection with orchard heaters that is so designed and constructed that the same may be set at a given point and will automatically feed the fuel to the burner of the orchard heater for a definite predetermined period of time without the necessity of manual control.

Other objects and advantages of this invention will be apparent from the following detailed description of a preferred embodiment thereof as illustrated in the accompanying drawings, in which drawings:

Figure 1 is a sectional side elevation of an orchard heater in which a flow regulator embodying this invention is embodied.

Figure 2 is a front elevation taken substantially on the line 2—2 of Figure 1.

Figure 3 is an enlarged central sectional side elevation of a flow regulator control embodying this invention.

In the preferred embodiment of this invention illustrated in the accompanying drawings 1 illustrates an orchard heater which may be of any desired or preferred construction and is herein illustrated as comprising a cylindrical body 2 to which a cover 3 is adjustably secured by means of spring connecting members 4 so that a draft chimney effect is obtained at the top of the cylindrical body 2 which creates a draft to draw air into the body 2 through the perforations 5 formed in the bottom of the body 2. The fuel burner comprises an annular chamber 6 formed around an air inlet cap 7 having a plurality of perforations 8 therein through which the air admitted through the perforations is drawn by the draft created by the chimney effect provided by the cover 3 at the top of the cylindrical body 2. A reservoir or tank 9 of fuel to be burned in the burner of the orchard heater 1 is provided which is preferably comparatively shallow so that the height of the liquid or fuel within the reservoir 9 is comparatively small relative to the horizontal area of the fuel within the container 9. The fuel from the container 9 is conveyed to the burner through a rotatable stand-pipe 10, one end of which passes into and through the body 2 of the orchard heater 1 and discharges the fuel into the annual ring chamber 6 in which the fuel is burned. The stand-pipe 10 passes through a stuffing box 11 into the container 9. The stuffing box 11 being provided to prevent leakage of the fuel from the container 9 and may be of any desired or preferred construction and is herein illustrated as composed of a flange 12 which is rigidly secured to the container 9 with its central passage in communication with a hole formed through the body 9 at a point near the lower level thereof. A cap 13 is provided which is threaded to the flange 12 and packing 14 is interposed between the cap 13 and the flange 12 to provide a fluid tight connection between the stand-pipe 10 and the flange 12 so that the fuel will not leak from the container at this point and so as to permit the stand-pipe 10 to be rotated. The stand-pipe 10 is curved upwardly as illustrated at 15 within the container 9 and has a vertical extension 16 which extends upward into the container when in the vertical position to a point above the normal level of the fuel within the container 9 such as is illustrated at 17ª. A handle 17 is rigidly fixed to the stand-pipe 10 on the exterior of the container 9 for rotating the stand-pipe 10 so that the fuel will be fed from the stand-pipe 10 into the annular chamber 6. An arcuate rack 18 may be formed on the exterior surface of the container 9 so as to maintain the handle 17 and hence the stand-pipe 10 in any desired adjusted position. The container 9 is provided with an annular flange 19 which provides a filling opening for filling the container 9. A filler opening cap 20 is adapted to fit the annular flange 19 to close the filling opening when the tank is filled. The cap 20 loosely fits the flange 19 so as to permit the entrance of air into the container 9 so as to permit the flow of the fuel through the stand-pipe 10 to the annular chamber 6.

In order to maintain a close control of the rate of flow of the fuel from the container 9, the upper end 21 of the stand-pipe 10 is provided with a flow control member 22, which flow control member 22 is preferably composed of a block of metal having an enlarged centrally disposed cylindrical bore 23 formed therein which is screw-threaded to the end of the section 16 of the stand-pipe 10. The control member 22 above the central bore 23 is provided with a small flow control orifice 24 which is of such size as to regulate the flow of the fuel from the container 9 to the chamber 6. A cup screen 25 is seated over the control block 22 and is retained thereon by means of a ring 26 which closely fits over the screen 25 and control block 22 so as to frictionally hold the cup screen 25 in position. The screen 25 is for the purpose of preventing the admission of dirt or other foreign matter into the control orifice 24 so that the same will not become stuffed up to prevent the flow of fuel from the container 9 to the annular chamber 6 of the orchard heater 1.

I have discovered that by employing such a flow control orifice 24 at the end of the vertical section 16 of the stand-pipe 10 that the flow of fuel from the container 9 may be closely regulated so that the flow is of a definite rate practically irrespective of the head of flow above the depth to which the flow control block 22 is set within the container 9 and that by this method a control may be had of the flow of fuel from the container 9 to the burner of the orchard heater 1 which will provide a constant and uniform flow and consequently control the burning of the orchard heater 1 without the necessity of maintaining a constant watch over the operation of the orchard heater 1.

In order to properly control the flow of fluid from such a container 9, I have found that the control orifice 24 should be of a size to correspond with the perforations formed in a Number 50 to 70 wire gauge.

Having fully described a preferred embodiment of this invention, it is to be understood that I do not wish to be limited to the exact details herein set forth which may obviously be varied without departing from the spirit of my invention as set forth in the appended claim.

I claim:

In an orchard heater, the combination of a heater having a burner on the interior thereof, a fuel supply reservoir disposed near the heater, a fuel pipe having a body extending substantially horizontally through the wall of the heater and through the wall of the reservoir, with its delivery end in a position to feed fuel to said burner, said fuel pipe having an extension within the reservoir extending laterally from the said body and having an inlet at its outer end, and a handle attached rigidly to the body of the fuel pipe on the exterior of the reservoir for rotating the pipe in the walls of the heater and reservoir to hold the inlet end of the fuel pipe above the level of the liquid in the reservoir or below the same.

Signed at Azusa, California, this 5th day of December, 1925.

PAUL G. BULKLEY.